United States Patent
Ren et al.

(10) Patent No.: US 9,674,695 B2
(45) Date of Patent: Jun. 6, 2017

(54) METHOD, TERMINAL, AND BASE STATION FOR TRANSMITTING INFORMATION

(71) Applicant: Huawei Technologies Co., Ltd., Shenzhen, Guangdong (CN)

(72) Inventors: Xiaotao Ren, Beijing (CN); Yongxing Zhou, Beijing (CN); Jingyuan Sun, Beijing (CN); Liang Xia, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 116 days.

(21) Appl. No.: 14/612,995

(22) Filed: Feb. 3, 2015

(65) Prior Publication Data
US 2015/0146622 A1    May 28, 2015

Related U.S. Application Data

(63) Continuation of application No. PCT/CN2012/079673, filed on Aug. 3, 2012.

(51) Int. Cl.
*H04W 8/22* (2009.01)
*H04L 5/00* (2006.01)
(Continued)

(52) U.S. Cl.
CPC .............. *H04W 8/22* (2013.01); *H04L 5/005* (2013.01); *H04L 5/0091* (2013.01); *H04W 48/16* (2013.01); *H04W 56/0005* (2013.01)

(58) Field of Classification Search
CPC ... H04W 8/22; H04W 48/16; H04W 56/0005; H04L 5/0091; H04L 5/005
See application file for complete search history.

(56) References Cited

U.S. PATENT DOCUMENTS

2009/0116421 A1    5/2009  Kawasaki
2009/0310549 A1   12/2009  Higuchi et al.
(Continued)

FOREIGN PATENT DOCUMENTS

CN    101467364 A    6/2009
CN    101578834 A   11/2009
(Continued)

OTHER PUBLICATIONS

"Physical-layer parameters to be configured by RRC", Ericsson, TSG-RAN WG2 #60bis, Jan. 14-18, 2008, 8 pages.
(Continued)

*Primary Examiner* — Pao Sinkantarakorn
*Assistant Examiner* — Kabir Jahangir
(74) *Attorney, Agent, or Firm* — Oblon, McClelland, Maier & Neustadt, L.L.P.

(57) ABSTRACT

Embodiments of the present application provide a method, a terminal, and a base station for transmitting information. In the embodiments of the present application, subframe configuration information of a first carrier is obtained, where the subframe configuration information is used to indicate a type-1 subframe of the first carrier and a type-2 subframe of the first carrier, the type-1 subframe is used for the base station to transmit, in system bandwidth, first information including a first CRS, the first CRS is used for demodulation, and the type-2 subframe is not used for the base station to transmit a CRS used for demodulation, so that the terminal can receive, according to the subframe configuration information and on the first carrier, information sent by the base station.

20 Claims, 2 Drawing Sheets

---

A terminal obtains subframe configuration information of a first carrier, where the subframe configuration information is used to indicate a type-1 subframe of the first carrier and a type-2 subframe of the first carrier, the type-1 subframe is used for a base station to transmit, in system bandwidth, first information including a first CRS, the first CRS is used for demodulation, and the type-2 subframe is not used for the base station to transmit a CRS used for demodulation — 101

↓

The terminal receives, according to the subframe configuration information and on the first carrier, information sent by the base station — 102

(51) Int. Cl.
*H04W 48/16* (2009.01)
*H04W 56/00* (2009.01)

(56) References Cited

U.S. PATENT DOCUMENTS

| | | | |
|---|---|---|---|
| 2012/0027110 A1* | 2/2012 | Han | H04J 11/0079 375/260 |
| 2013/0265945 A1* | 10/2013 | He | H04L 27/2657 370/329 |
| 2013/0301566 A1* | 11/2013 | Wei | H04W 72/048 370/329 |
| 2013/0329661 A1* | 12/2013 | Chen | H04W 72/0453 370/329 |
| 2013/0343300 A1* | 12/2013 | Kim | H04W 72/048 370/329 |
| 2015/0023331 A1* | 1/2015 | You | H04L 5/0048 370/336 |

FOREIGN PATENT DOCUMENTS

| | | |
|---|---|---|
| CN | 101989904 A | 3/2011 |
| CN | 102420685 A | 4/2012 |
| CN | 102573094 A | 7/2012 |
| EP | 2 244 393 A2 | 10/2010 |
| EP | 2 418 887 A2 | 2/2012 |
| EP | 2 779 774 A1 | 9/2014 |
| WO | WO 2010/151000 A2 | 12/2010 |

OTHER PUBLICATIONS

"Common Reference Symbol Mapping/Signaling for 8 Transmit Antenna", Texas Instruments, 3GPP TSG RAN WG1 #56, Feb. 9-13, 2009, 8 pages.

"Design Considerations for Additional Carrier Types", Alcatel-Lucent, 3GPP TSG RAN WG1 Meeting #67, Nov. 14-18, 2011, 4 pages.

"DRX for new carrier type", Intel Corporation, 3GPP TSG-RAN2 Meeting #78, May 21-25, 2012, 3 pages.

* cited by examiner

METHOD, TERMINAL, AND BASE STATION FOR TRANSMITTING INFORMATION

CROSS-REFERENCE TO RELATED APPLICATIONS

This application is a continuation of International Application No. PCT/CN2012/079673, filed on Aug. 3, 2012, which is hereby incorporated by reference in its entirety.

TECHNICAL FIELD

The present application relates to a communication technology, and in particular, to a method, a terminal, and a base station for transmitting information.

BACKGROUND

In a wireless communications system, such as: a long term evolution (Long Term Evolution, LTE) system, a new carrier type (New Carrier Type, NCT) is introduced, which may also be called an additional carrier type (Additional Carrier Type, ACT), and the name of this type is not limited in embodiments of the present application. An NCT carrier may not be capable of bearing a cell-specific reference signal (Cell-specific Reference Signal, CRS); or may be capable of bearing the CRS, however, the CRS cannot be transmitted in continuous subframes and cannot be used for demodulation (for example, cannot be used for demodulating control information, a broadcast message, or data). In addition, the NCT carrier may not be capable of bearing synchronization information or broadcast information. Therefore, a terminal may not be capable of independently access an NCT carrier cell. In this case, the terminal can only first access a non-NCT carrier cell, that is a backward compatible (legacy) carrier cell, so as to receive the synchronization information or the broadcast information. Then according to the foregoing received synchronization information or broadcast information, the terminal accesses the NCT carrier cell, so as to complete communication.

However, as for a scenario where the terminal only supports one carrier, the terminal may not be capable of accessing the NCT carrier cell; therefore, the terminal cannot perform communication through the NCT carrier cell.

SUMMARY

Multiple aspects of the present application provide a method, a terminal, and a base station for transmitting information, which are used to avoid a problem that, in a scenario where the terminal only supports one carrier, the terminal cannot access a cell of some types of carriers, such as a certain NCT carrier; therefore, the terminal cannot perform communication normally.

In one aspect of the present application, a method for transmitting information is provided and includes:

obtaining, by a terminal, subframe configuration information of a first carrier, where the subframe configuration information is used to indicate a type-1 subframe of the first carrier and a type-2 subframe of the first carrier, the type-1 subframe is used for a base station to transmit, in system bandwidth, first information including a first cell-specific reference signal CRS, the first CRS is used for demodulation, and the type-2 subframe is not used for the base station to transmit a CRS used for demodulation; and receiving, by the terminal according to the subframe configuration information and on the first carrier, information sent by the base station.

With reference to the aspect and any possible implementation manner mentioned above, an implementation manner is further provided, where second information transmitted in the type-2 subframe does not include: MIB information or SIB information; and the receiving, by the terminal according to the subframe configuration information and on the first carrier, information sent by the base station includes:

receiving, by the terminal according to the subframe configuration information and in the type-1 subframe of the first carrier, the MIB information and/or the SIB information sent by the base station, where the MIB information and/or the SIB information can be demodulated by the first CRS.

With reference to the aspect and any possible implementation manner mentioned above, an implementation manner is further provided, where the obtaining, by a terminal, subframe configuration information includes:

obtaining, by the terminal, the subframe configuration information according to preconfigured configuration information; or receiving, by the terminal, the subframe configuration information sent by the base station.

With reference to the aspect and any possible implementation manner mentioned above, an implementation manner is further provided, where the receiving, by the terminal, the subframe configuration information sent by the base station includes:

receiving, by the terminal, the subframe configuration information sent by the base station through RRC signaling; or receiving, by the terminal, the subframe configuration information sent by the base station by using a broadcast message; or receiving, by the terminal, the subframe configuration information sent by the base station through a PDCCH or an ePDCCH.

With reference to the aspect and any possible implementation manner mentioned above, an implementation manner is further provided, where a position of the type-2 subframe partially or completely overlaps with a position of an MBSFN subframe.

With reference to the aspect and any possible implementation manner mentioned above, an implementation manner is further provided, where the first carrier includes:

all carriers supported by the terminal; or partial carriers supported by the terminal.

With reference to the aspect and any possible implementation manner mentioned above, an implementation manner is further provided, where the type-2 subframe is used for the base station to transmit the second information including a second CRS, and the second CRS is used to perform synchronization.

With reference to the aspect and any possible implementation manner mentioned above, an implementation manner is further provided, before the receiving, by the terminal according to the subframe configuration information and on the first carrier, information sent by the base station, further including:

obtaining, by the terminal, configuration information of the first CRS or configuration information of the second CRS, which is used to indicate configuration of the first CRS or configuration of the second CRS; and the receiving, by the terminal according to the subframe configuration information and on the first carrier, information sent by the base station includes:

receiving, by the terminal according to the subframe configuration information, and the configuration information of the first CRS or the configuration information of the second CRS, the information sent by the base station.

With reference to the aspect and any possible implementation manner mentioned above, an implementation manner is further provided, where the obtaining, by the terminal, configuration information of the first CRS or configuration information of the second CRS includes:

obtaining, by the terminal, the configuration information of the first CRS or the configuration information of the second CRS according to the preconfigured configuration information; or receiving, by the terminal, the configuration information of the first CRS or the configuration information of the second CRS, which is sent by the base station.

With reference to the aspect and any possible implementation manner mentioned above, an implementation manner is further provided, where the receiving, by the terminal, the configuration information of the first CRS or the configuration information of the second CRS, which is sent by the base station includes:

receiving, by the terminal, the configuration information of the first CRS or the configuration information of the second CRS, which is sent by the base station through the RRC signaling; or receiving, by the terminal, the configuration information of the first CRS or the configuration information of the second CRS, which is sent by the base station by using the broadcast message; or receiving, by the terminal, the configuration information of the first CRS or the configuration information of the second CRS, which is sent by the base station through the PDCCH or the ePDCCH.

In another aspect of the present application, a method for transmitting information is provided and includes:

determining, by a base station, subframe configuration information of a first carrier, where the subframe configuration information is used to indicate a type-1 subframe of the first carrier and a type-2 subframe of the first carrier, the type-1 subframe is used for a base station to transmit, in system bandwidth, first information including a first CRS, the first CRS is used for demodulation, and the type-2 subframe is not used for the base station to transmit a CRS used for demodulation; and sending, by the base station, information on the first carrier according to the subframe configuration information.

With reference to the aspect and any possible implementation manner mentioned above, an implementation manner is further provided, where second information transmitted in the type-2 subframe does not include: MIB information or SIB information; and the sending, by the base station, information on the first carrier according to the subframe configuration information includes:

sending, by the base station, the MIB information and/or the SIB information in the type-1 subframe of the first carrier according to the subframe configuration information, where the MIB information and/or the SIB information can be demodulated by the first CRS.

With reference to the aspect and any possible implementation manner mentioned above, an implementation manner is further provided, after the determining, by a base station, subframe configuration information, and before the sending, by the base station, information on the first carrier according to the subframe configuration information, further including:

sending, by the base station, the subframe configuration information.

With reference to the aspect and any possible implementation manner mentioned above, an implementation manner is further provided, where the sending, by the base station, the subframe configuration information includes:

sending, by the base station, the subframe configuration information to the terminal through RRC signaling; or sending, by the base station, the subframe configuration information by using a broadcast message; or sending, by the base station, the subframe configuration information to the terminal through a PDCCH or an ePDCCH.

With reference to the aspect and any possible implementation manner mentioned above, an implementation manner is further provided, where a position of the type-2 subframe partially or completely overlaps with a position of an MBSFN subframe.

With reference to the aspect and any possible implementation manner mentioned above, an implementation manner is further provided, where the first carrier includes:

all carriers supported by the terminal; or
partial carriers supported by the terminal.

With reference to the aspect and any possible implementation manner mentioned above, an implementation manner is further provided, where the type-2 subframe is used for the base station to transmit the second information including a second CRS, and the second CRS is used to perform synchronization.

With reference to the aspect and any possible implementation manner mentioned above, an implementation manner is further provided, before the sending, by the base station, information on the first carrier according to the subframe configuration information, the method further includes:

determining, by the base station, configuration information of the first CRS or configuration information of the second CRS, which is used to indicate configuration of the first CRS or configuration of the second CRS; and the sending, by the base station, information on the first carrier according to the subframe configuration information includes:

sending, by the base station, the information on the first carrier according to the subframe configuration information, and the configuration information of the first CRS or the configuration information of the second CRS.

With reference to the aspect and any possible implementation manner mentioned above, an implementation manner is further provided, after the determining, by the base station, configuration information of the first CRS or configuration information of the second CRS, further including:

sending, by the base station, the configuration information of the first CRS or the configuration information of the second CRS.

With reference to the aspect and any possible implementation manner mentioned above, an implementation manner is further provided, where the sending, by the base station, the configuration information of the first CRS or the configuration information of the second CRS includes:

sending, by the base station, the configuration information of the first CRS or the configuration information of the second CRS to the terminal through the RRC signaling; or sending, by the base station, the configuration information of the first CRS or the configuration information of the second CRS by using the broadcast message; or sending, by the base station, the configuration information of the first CRS or the configuration information of the second CRS to the terminal through the PDCCH or the ePDCCH.

In another aspect of the present application, a terminal is provided and includes:

a receiving unit, configured to obtain subframe configuration information of a first carrier, and transmit the subframe configuration information to a determining unit, where the subframe configuration information is used to indicate a type-1 subframe of the first carrier and a type-2 subframe of the first carrier, the type-1 subframe is used for a base station to transmit, in system bandwidth, first information including a first CRS, the first CRS is used for demodulation, and the type-2 subframe is not used for the base station to transmit a CRS used for demodulation; and the determining unit, configured to determine the type-1 subframe of the first carrier and the type-2 subframe of the first carrier according to the subframe configuration information, where the receiving unit is further configured to receive, according to the type-1 subframe of the first carrier and the type-2 subframe of the first carrier that are determined by the determining unit and on the first carrier, information sent by the base station.

With reference to the aspect and any possible implementation manner mentioned above, an implementation manner is further provided, where second information transmitted in the type-2 subframe does not include: MIB information or SIB information; and the receiving unit is specifically configured to receive, in the type-1 subframe of the first carrier determined by the determining unit, the MIB information and/or the SIB information sent by the base station, where the MIB information and/or the SIB information can be demodulated by the first CRS.

With reference to the aspect and any possible implementation manner mentioned above, an implementation manner is further provided, where the receiving unit is specifically configured to obtain the subframe configuration information according to preconfigured configuration information; or receive the subframe configuration information sent by the base station.

With reference to the aspect and any possible implementation manner mentioned above, an implementation manner is further provided, where the receiving unit is specifically configured to receive the subframe configuration information sent by the base station through RRC signaling; or receive the subframe configuration information sent by the base station by using a broadcast message; or receive the subframe configuration information sent by the base station through a PDCCH or an ePDCCH.

With reference to the aspect and any possible implementation manner mentioned above, an implementation manner is further provided, where a position of the type-2 subframe partially or completely overlaps with a position of an MBSFN subframe.

With reference to the aspect and any possible implementation manner mentioned above, an implementation manner is further provided, where the first carrier includes:

all carriers supported by the terminal; or partial carriers supported by the terminal.

With reference to the aspect and any possible implementation manner mentioned above, an implementation manner is further provided, where the type-2 subframe is used for the base station to transmit the second information including a second CRS, and the second CRS is used to perform synchronization.

With reference to the aspect and any possible implementation manner mentioned above, an implementation manner is further provided, where the receiving unit is further configured to obtain configuration information of the first CRS or configuration information of the second CRS, where the configuration information of the first CRS or the configuration information of the second CRS is used to indicate configuration of the first CRS or configuration of the second CRS; and the receiving unit is specifically configured to receive, according to the type-1 subframe of the first carrier and the type-2 subframe of the first carrier that are determined by the determining unit, and the configuration information of the first CRS or the configuration information of the second CRS, the information sent by the base station.

With reference to the aspect and any possible implementation manner mentioned above, an implementation manner is further provided, where the receiving unit is specifically configured to obtain the configuration information of the first CRS or the configuration information of the second CRS according to the preconfigured configuration information; or receive the configuration information of the first CRS or the configuration information of the second CRS, which is sent by the base station.

With reference to the aspect and any possible implementation manner mentioned above, an implementation manner is further provided, where the receiving unit is specifically configured to receive the configuration information of the first CRS or the configuration information of the second CRS, which is sent by the base station through the RRC signaling; or receive the configuration information of the first CRS or the configuration information of the second CRS, which is sent by the base station by using the broadcast message; or receive the configuration information of the first CRS or the configuration information of the second CRS, which is sent by the base station through the PDCCH or the ePDCCH.

In another aspect of the present application, abase station is provided and includes:

a determining unit, configured to determine subframe configuration information of a first carrier, and transmit the subframe configuration information to a sending unit, where the subframe configuration information is used to indicate a type-1 subframe of the first carrier and a type-2 subframe of the first carrier, the type-1 subframe is used for the base station to transmit, in system bandwidth, first information including a first CRS, the first CRS is used for demodulation, and the type-2 subframe is not used for the base station to transmit a CRS used for demodulation; and the sending unit, configured to send information on the first carrier according to the subframe configuration information.

With reference to the aspect and any possible implementation manner mentioned above, an implementation manner is further provided, where second information transmitted in the type-2 subframe does not include: MIB information or SIB information; and the sending unit is specifically configured to send the MIB information and/or the SIB information in the type-1 subframe of the first carrier according to the subframe configuration information, where the MIB information and/or the SIB information can be demodulated by the first CRS.

With reference to the aspect and any possible implementation manner mentioned above, an implementation manner is further provided, where the sending unit is further configured to send the subframe configuration information.

With reference to the aspect and any possible implementation manner mentioned above, an implementation manner is further provided, where the sending unit is specifically configured to send the subframe configuration information to a terminal through RRC signaling; or send the subframe configuration information by using a broadcast message; or send the subframe configuration information to a terminal through a PDCCH or an ePDCCH.

With reference to the aspect and any possible implementation manner mentioned above, an implementation manner is further provided, where a position of the type-2 subframe partially or completely overlaps with a position of an MBSFN subframe.

With reference to the aspect and any possible implementation manner mentioned above, an implementation manner is further provided, where the first carrier includes:

all carriers supported by the terminal; or partial carriers supported by the terminal.

With reference to the aspect and any possible implementation manner mentioned above, an implementation manner is further provided, where the type-2 subframe is used for the base station to transmit the second information including a second CRS, and the second CRS is used to perform synchronization.

With reference to the aspect and any possible implementation manner mentioned above, an implementation manner is further provided, where the determining unit is further configured to determine configuration information of the first CRS or configuration information of the second CRS, and transmit the configuration information of the first CRS or the configuration information of the second CRS to the sending unit, where the configuration information of the first CRS or the configuration information of the second CRS is used to indicate configuration of the first CRS or configuration of the second CRS; and the sending unit is specifically configured to send the information on the first carrier according to the subframe configuration information, and the configuration information of the first CRS or the configuration information of the second CRS.

With reference to the aspect and any possible implementation manner mentioned above, an implementation manner is further provided, where the sending unit is further configured to send the configuration information of the first CRS or the configuration information of the second CRS.

With reference to the aspect and any possible implementation manner mentioned above, an implementation manner is further provided, where the sending unit is specifically configured to send the configuration information of the first CRS or the configuration information of the second CRS to the terminal through the RRC signaling; or send the configuration information of the first CRS or the configuration information of the second CRS by using the broadcast message; or send the configuration information of the first CRS or the configuration information of the second CRS to the terminal through the PDCCH or the ePDCCH.

In another aspect of the present application, a terminal is provided and includes:

a receiver, configured to obtain subframe configuration information of a first carrier, and transmit the subframe configuration information to a processor, where the subframe configuration information is used to indicate a type-1 subframe of the first carrier and a type-2 subframe of the first carrier, the type-1 subframe is used for a base station to transmit, in system bandwidth, first information including a first CRS, the first CRS is used for demodulation, and the type-2 subframe is not used for the base station to transmit a CRS used for demodulation; and the processor, configured to determine the type-1 subframe of the first carrier and the type-2 subframe of the first carrier according to the subframe configuration information, where the receiver is further configured to receive, according to the type-1 subframe of the first carrier and the type-2 subframe of the first carrier that are determined by the processor and on the first carrier, information sent by the base station.

With reference to the aspect and any possible implementation manner mentioned above, an implementation manner is further provided, where second information transmitted in the type-2 subframe does not include: MIB information or SIB information; and the receiver is specifically configured to receive, in the type-1 subframe of the first carrier determined by the processor, the MIB information and/or the SIB information sent by the base station, where the MIB information and/or the SIB information can be demodulated by the first CRS.

With reference to the aspect and any possible implementation manner mentioned above, an implementation manner is further provided, where the receiver is specifically configured to obtain the subframe configuration information according to preconfigured configuration information; or receive the subframe configuration information sent by the base station.

With reference to the aspect and any possible implementation manner mentioned above, an implementation manner is further provided, where the receiver is specifically configured to receive the subframe configuration information sent by the base station through RRC signaling; or receive the subframe configuration information sent by the base station by using a broadcast message; or receive the subframe configuration information sent by the base station through a PDCCH or an ePDCCH.

With reference to the aspect and any possible implementation manner mentioned above, an implementation manner is further provided, where a position of the type-2 subframe partially or completely overlaps with a position of an MBSFN subframe.

With reference to the aspect and any possible implementation manner mentioned above, an implementation manner is further provided, where the first carrier includes:

all carriers supported by the terminal; or partial carriers supported by the terminal.

With reference to the aspect and any possible implementation manner mentioned above, an implementation manner is further provided, where the type-2 subframe is used for the base station to transmit the second information including a second CRS, and the second CRS is used to perform synchronization.

With reference to the aspect and any possible implementation manner mentioned above, an implementation manner is further provided, where the receiver is further configured to obtain configuration information of the first CRS or configuration information of the second CRS, where the configuration information of the first CRS or the configuration information of the second CRS is used to indicate configuration of the first CRS or configuration of the second CRS; and the receiver is specifically configured to receive, according to the type-1 subframe of the first carrier and the type-2 subframe of the first carrier that are determined by the processor, and the configuration information of the first CRS or the configuration information of the second CRS, the information sent by the base station.

With reference to the aspect and any possible implementation manner mentioned above, an implementation manner is further provided, where the receiver is specifically configured to obtain the configuration information of the first CRS or the configuration information of the second CRS according to the preconfigured configuration information; or receive the configuration information of the first CRS or the configuration information of the second CRS, which is sent by the base station.

With reference to the aspect and any possible implementation manner mentioned above, an implementation manner is further provided, where the receiver is specifically configured to receive the configuration information of the first CRS or the configuration information of the second CRS, which is sent by the base station through the RRC signaling; or receive the configuration information of the first CRS or the configuration information of the second CRS, which is sent by the base station by using the broadcast message; or receive the configuration information of the first CRS or the configuration information of the second CRS, which is sent by the base station through the PDCCH or the ePDCCH.

In another aspect of the present application, a base station is provided and includes:

a processor, configured to determine subframe configuration information of a first carrier, and transmit the subframe configuration information to a sender, where the subframe configuration information is used to indicate a type-1 subframe of the first carrier and a type-2 subframe of the first carrier, the type-1 subframe is used for a base station to transmit, in system bandwidth, first information including a first CRS, the first CRS is used for demodulation, and the type-2 subframe is not used for the base station to transmit a CRS used for demodulation; and the sender, configured to send information on the first carrier according to the subframe configuration information.

With reference to the aspect and any possible implementation manner mentioned above, an implementation manner is further provided, where second information transmitted in the type-2 subframe does not include: MIB information or SIB information; and the sender is specifically configured to send the MIB information and/or the SIB information in the type-1 subframe of the first carrier according to the subframe configuration information, where the MIB information and/or the SIB information can be demodulated by the first CRS.

With reference to the aspect and any possible implementation manner mentioned above, an implementation manner is further provided, where the sender is further configured to send the subframe configuration information.

With reference to the aspect and any possible implementation manner mentioned above, an implementation manner is further provided, where the sender is specifically configured to send the subframe configuration information to a terminal through RRC signaling; or send the subframe configuration information by using a broadcast message; or send the subframe configuration information to a terminal through a PDCCH or an ePDCCH.

With reference to the aspect and any possible implementation manner mentioned above, an implementation manner is further provided, where a position of the type-2 subframe partially or completely overlaps with a position of an MBSFN subframe.

With reference to the aspect and any possible implementation manner mentioned above, an implementation manner is further provided, where the first carrier includes:

all carriers supported by the terminal; or partial carriers supported by the terminal.

With reference to the aspect and any possible implementation manner mentioned above, an implementation manner is further provided, where the type-2 subframe is used for the base station to transmit the second information including a second CRS, and the second CRS is used to perform synchronization.

With reference to the aspect and any possible implementation manner mentioned above, an implementation manner is further provided, where the processor is further configured to determine configuration information of the first CRS or configuration information of the second CRS, and transmit the configuration information of the first CRS or the configuration information of the second CRS to the sender, where the configuration information of the first CRS or the configuration information of the second CRS is used to indicate configuration of the first CRS or configuration of the second CRS; and the sender is specifically configured to send the information on the first carrier according to the subframe configuration information, and the configuration information of the first CRS or the configuration information of the second With reference to the aspect and any possible implementation manner mentioned above, an implementation manner is further provided, where the sender is further configured to send the configuration information of the first CRS or the configuration information of the second CRS.

With reference to the aspect and any possible implementation manner mentioned above, an implementation manner is further provided, where the sender is specifically configured to send the configuration information of the first CRS or the configuration information of the second CRS to the terminal through the RRC signaling; or send the configuration information of the first CRS or the configuration information of the second CRS by using the broadcast message; or send the configuration information of the first CRS or the configuration information of the second CRS to the terminal through the PDCCH or the ePDCCH.

It can be known from the foregoing technical solutions that, in the embodiments of the present application, the terminal obtains the subframe configuration information of the first carrier, where the subframe configuration information is used to indicate the type-1 subframe of the first carrier and the type-2 subframe of the first carrier, the type-1 subframe is used for the base station to transmit, in system bandwidth, the first information including the first CRS, the first CRS is used for demodulation, and the type-2 subframe is not used for the base station to transmit the CRS used for demodulation, so that the terminal can receive, according to the subframe configuration information and on the first carrier, the information sent by the base station. Because the first carrier is configured with the type-1 subframe corresponding to a non-NCT carrier (that is, a legacy carrier) and the type-2 subframe corresponding to an NCT carrier, the terminal can independently access a first carrier cell, that is, a first carrier cell corresponding to the non-NCT carrier (that is, the legacy carrier) or a first carrier cell corresponding to the NCT carrier, which may avoid a problem that, in a scenario where the terminal only supports one carrier, the terminal cannot access an NCT carrier cell; therefore, the terminal cannot perform communication through the NCT carrier cell.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION

To make the objectives, technical solutions, and advantages of the embodiments of the present application more comprehensible, the following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

Technical solutions of the present invention may be applied to various wireless communications systems, such as: a global system for mobile communications (Global System for Mobile Communications, GSM for short), a general packet radio service (General Packet Radio Service, GPRS for short) system, a code division multiple access (Code Division Multiple Access, CDMA for short) system, a CDMA2000 system, a wideband code division multiple access (Wideband Code Division Multiple Access, WCDMA for short) system, a long term evolution (Long Term Evolution, LTE for short) system, or a world interoperability for microwave access (World Interoperability for Microwave Access, WiMAX for short) system.

A base station may be a base station controller (Base Station Controller, BSC for short) in the GSM system, the GPRS system, or the CDMA system, or a radio network controller (Radio Network Controller, RNC for short) in the CDMA2000 system or the WCDMA system, or an evolved NodeB (Evolved NodeB, eNB for short) in the LTE system, or an access service network base station (Access Service Network Base Station, ASN BS for short) in the WiMAX network.

In addition, the wording "and/or" in this document merely describes an association between associated objects, indicating that three relationships may exist, for example, A and/or B may indicate three situations: only A exists, A and B exist at the same time, and only B exists. Moreover, the character "/" in this document usually represents that the former and later associated objects are in an "or" relationship.

Figure 1:
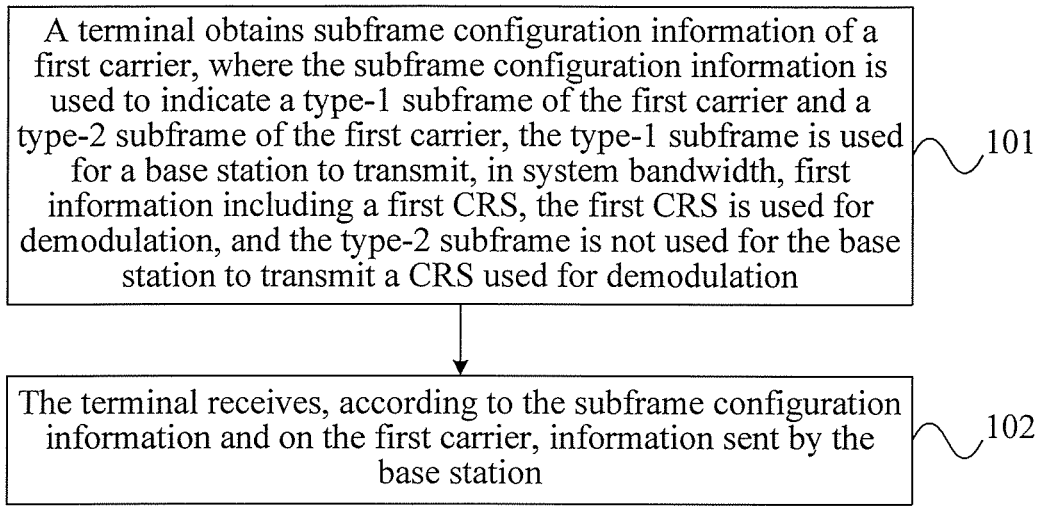
FIG. 1 is a schematic flow chart of a method for transmitting information provided in an embodiment of the present application.

FIG. 1 is a schematic flow chart of a method for transmitting information provided in an embodiment of the present application, as shown in FIG. 1.

101: A terminal obtains subframe configuration information of a first carrier, where the subframe configuration information is used to indicate a type-1 subframe of the first carrier and a type-2 subframe of the first carrier, the type-1 subframe is used for a base station to transmit, in system bandwidth, first information including a first CRS, the first CRS is used for demodulation, and the type-2 subframe is not used for the base station to transmit a CRS used for demodulation.

102: The terminal receives, according to the subframe configuration information and on the first carrier, information sent by the base station.

It should be noted that, the type-1 subframe transmits, in the system bandwidth, the first information including the first CRS, and besides including the first CRS, the first information may further include but is not limited to control information, a broadcast message, or data.

It should be noted that, 101 and 102 may be executed by the terminal.

It can be understood that, the first carrier is an NCT carrier generated after an existing NCT carrier is improved. According to contents transmitted in the type-1 subframe and the type-2 subframe, the type-1 subframe may correspond to a subframe transmitted in a non-NCT carrier (that is, a legacy carrier), and the type-2 subframe may correspond to a subframe transmitted in the existing NCT carrier.

Optionally, in a possible implementation manner of the embodiment, as for the type-1 subframe, the first information transmitted in the type-1 subframe may include but is not limited to MIB information and/or SIB information; as for the type-2 subframe, second information transmitted in the type-2 subframe does not include the MIB information or the SIB information. That is to say, in 102, the terminal may specifically receive, according to the subframe configuration information and in the type-1 subframe of the first carrier, the MIB information and/or the SIB information sent by the base station, where the MIB information and/or the SIB information can be demodulated by the first CRS; and the terminal may specifically determine, according to the subframe configuration information, that the second information transmitted in the type-2 subframe does not include the MIB information or the SIB information, and therefore, the terminal does not receive, in the type-2 subframe, the MIB information or the SIB information sent by the base station.

It should be noted that, the information sent by the base station may be the first information, or may also be the second information, which is not limited in the embodiment.

Optionally, in a possible implementation manner of the embodiment, the terminal may specifically obtain the subframe configuration information according to preconfigured configuration information, such as a protocol agreement.

Optionally, in a possible implementation manner of the embodiment, the terminal may specifically receive the subframe configuration information sent by the base station.

Specifically, the subframe configuration information is indicated by using a bitmap (bitmap), such as a bitmap 0111001110, where an $N^{th}$ bit indicates an $N^{th}$ subframe, and the N is an integer ranging from 0 to 9. When a value of the $N^{th}$ bit is 0, it indicates the type-1 subframe; when a value of the $N^{th}$ bit is 1, it indicates the type-2 subframe. The bitmap may indicate that a subframe numbered 0, 4, 5 or 9 is a type-1 subframe and a subframe numbered 1, 2, 3, 6, 7, or 8 is a type-2 subframe.

Specifically, the terminal may specifically receive the subframe configuration information sent by the base station through higher layer signaling or a control channel.

For example, the high layer signaling may be radio resource control (Radio Resource Control, RRC) signaling. Specifically, the subframe configuration information may be carried through an information element (Information Element, IE) in the RRC signaling. The RRC signaling may be RRC signaling in the prior art, such as an RRC connection reconfiguration (RRC CONNECTION RECONFIGURATION) message or the like, which is not limited in the embodiment. The subframe configuration information is carried by extending the IE in the existing RRC signaling, or the RRC signaling may also be different from the existing RRC signaling in the prior art.

For another example, the high layer signaling may be the broadcast message. Specifically, the subframe configuration information may be carried through system information block (System Information Block, SIB) information in the broadcast message. The SIB information may be SIB information in the prior art, such as SIB1 information or SIB2 information, which is not limited in the embodiment. The subframe configuration information is carried by extending the existing SIB information, or the SIB information may also be different from the existing SIB information in the prior art.

For another example, the control channel may be a physical downlink control channel (Physical Downlink Control Channel, PDCCH) or an enhanced PDCCH (Enhanced PDCCH, ePDCCH). Specifically, the terminal may receive the subframe configuration information sent by the base station to the terminal through the PDCCH or the ePDCCH, or may further receive the subframe configuration information sent by the base station to a group to which the terminal belongs through the PDCCH or the ePDCCH.

Optionally, in a possible implementation manner of the embodiment, a position of the type-2 subframe may partially or completely overlap with a position of a multicast/broadcast single frequency network (Multicast/Broadcast Single Frequency Network, MBSFN) subframe, for example, may be one subframe or a combination of several subframes except subframes numbered 0, 4, 5, and 9.

Optionally, in a possible implementation manner of the embodiment, if the terminal has a carrier aggregation (Carrier Aggregation, CA) capability, the terminal may support at least two carriers, that is, the terminal may access a cell corresponding to at least two carriers.

Then, in one possible situation, the first carrier may include all carriers supported by the terminal.

Then, in another possible situation, the first carrier may include partial carriers supported by the terminal, so other carriers supported by the terminal may be NCT carriers. In this case, on the first carrier and the NCT carrier, there is no need to transmit the first CRS in all the subframes, which may save a large number of transmission overheads, thereby improving system throughput.

Optionally, in a possible implementation manner of the embodiment, the type-2 subframe may be used for the base station to transmit the second information including the second CRS. The second CRS does not have a function used for demodulation, but has a function which may be used for synchronization.

It should be noted that, the type-2 subframe transmits, in the system bandwidth, the second information including the second CRS, and besides including the second CRS, the second information may further include but is not limited to control information, a broadcast message, or data.

Because the first CRS is no longer transmitted in the type-2 subframe, other reference signals (Reference Signal, RS) (such as the second CRS) transmitted in the type-2 subframe may not be transmitted in each type-2 subframe; instead, the other RSs may be transmitted according to a configured transmission period (such as 5 milliseconds). Therefore, compared with the type-1 subframe, the type-2 subframe has more transmission resources which may be used to transmit data.

It can be understood that, configuration information of the first CRS may be different from configuration information of the second CRS. For example, the port number of the first CRS is 2, and the port number of the second CRS is 1. For another example, the first CRS may be transmitted in each type-1 subframe, and the transmission period of the second CRS in the type-2 subframe may be 5 milliseconds (ms).

It can be understood that, before 102, the terminal may further obtain the configuration information of the first CRS and/or the configuration information of the second CRS. The configuration information of the first CRS and/or the configuration information of the second CRS is used to indicate configuration of the first CRS and/or configuration of the second CRS.

Correspondingly, in 102, the terminal may specifically receive the information sent by the base station according to the subframe configuration information, and the configuration information of the first CRS and/or the configuration information of the second CRS.

Specifically, the terminal may specifically obtain the configuration information of the first CRS and/or the configuration information of the second CRS according to the preconfigured configuration information, such as a protocol agreement.

Specifically, the terminal may specifically receive the configuration information of the first CRS and/or the configuration information of the second CRS, which is sent by the base station through the high layer signaling or the control channel.

For example, the high layer signaling may be the radio resource control (Radio Resource Control, RRC) signaling. Specifically, the configuration information of the first CRS and/or the configuration information of the second CRS may be carried through the information element (Information Element, IE) in the RRC signaling. The RRC signaling may be the RRC signaling in the prior art, such as an RRC connection reconfiguration (RRC CONNECTION RECONFIGURATION) message or the like, which is not limited in the embodiment. The configuration information of the first CRS and/or the configuration information of the second CRS is carried by extending the IE of the existing RRC signaling, or the RRC signaling may also be different from the existing RRC signaling in the prior art.

For another example, the high layer signaling may be the broadcast message. Specifically, the configuration information of the first CRS and/or the configuration information of the second CRS may be carried through system information block (System Information Block, SIB) information in the broadcast message. The SIB information may be the SIB information in the prior art, such as SIB1 information or SIB2 information, which is not limited in the embodiment. The configuration information of the first CRS and/or the configuration information of the second CRS is carried by extending the existing SIB information, or the SIB information may also be different from the existing SIB information in the prior art.

For another example, the control channel may be the physical downlink control channel (Physical Downlink Control Channel, PDCCH) or the enhanced PDCCH (Enhanced PDCCH, ePDCCH). Specifically, the terminal may receive the configuration information of the first CRS and/or the configuration information of the second CRS, which is sent by the base station to the terminal through the PDCCH or the ePDCCH, or may further receive the configuration information of the first CRS and/or the configuration information of the second CRS, which is sent by the base station to the group to which the terminal belongs through the PDCCH or the ePDCCH.

In the embodiment, the terminal obtains the subframe configuration information of the first carrier, where the subframe configuration information is used to indicate the type-1 subframe of the first carrier and the type-2 subframe of the first carrier, the type-1 subframe is used for the base station to transmit, in the system bandwidth, the first information including the first CRS, the first CRS is used for demodulation, and the type-2 subframe is not used for the base station to transmit the CRS used for demodulation, so that the terminal can receive, according to the subframe configuration information and on the first carrier, the information sent by the base station. Because the first carrier is configured with the type-1 subframe corresponding to the non-NCT carrier (that is, the legacy carrier) and the type-2 subframe corresponding to the NCT carrier, the terminal can independently access a first carrier cell, that is, a first carrier cell corresponding to the non-NCT carrier (that is, the legacy carrier) or a first carrier cell corresponding to the NCT carrier, which may avoid a problem that, in a scenario where the terminal only supports one carrier, the terminal cannot access an NCT carrier cell; therefore, the terminal cannot perform communication through the NCT carrier cell.

Figure 2:
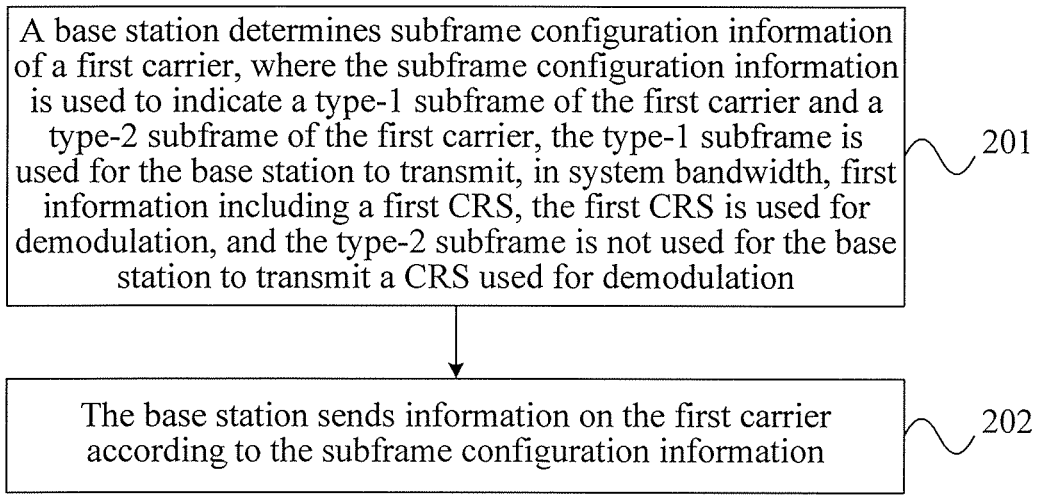
FIG. 2 is a schematic flow chart of a method for transmitting information provided in another embodiment of the present application.

FIG. 2 is a schematic flow chart of a method for transmitting information provided in another embodiment of the present application, as shown in FIG. 2.

201: A base station determines subframe configuration information of a first carrier, where the subframe configuration information is used to indicate a type-1 subframe of the first carrier and a type-2 subframe of the first carrier, the type-1 subframe is used for the base station to transmit, in system bandwidth, first information including a first CRS, the first CRS is used for demodulation, and the type-2 subframe is not used for the base station to transmit a CRS used for demodulation.

202: The base station sends information on the first carrier according to the subframe configuration information.

It should be noted that, the type-1 subframe transmits, in the system bandwidth, the first information including the first CRS, and besides including the first CRS, the first information may further include but is not limited to control information, a broadcast message, or data.

It should be noted that, 201 and 202 may be executed by the base station.

It can be understood that, the first carrier is an NCT carrier generated after an existing NCT carrier is improved. According to contents transmitted in the type-1 subframe and the type-2 subframe, the type-1 subframe may correspond to a subframe transmitted in a non-NCT carrier (that is, a legacy carrier), and the type-2 subframe may correspond to a subframe transmitted in the existing NCT carrier.

Optionally, in a possible implementation manner of the embodiment, as for the type-1 subframe, the first information transmitted in the type-1 subframe may include but is not limited to MIB information and/or SIB information; as for the type-2 subframe, second information transmitted in the type-2 subframe does not include the MIB information or the SIB information. That is to say, in 202, the base station may specifically send the MIB information and/or the SIB information in the type-1 subframe of the first carrier according to the subframe configuration information, where the MIB information and/or the SIB information can be demodulated by the first CRS; and the base station may specifically determine, according to the subframe configuration information, that the second information transmitted in the type-2 subframe does not include the MIB information or the SIB information, and therefore, the base station does not send the MIB information or the SIB information in the type-2 subframe.

It should be noted that, the information sent by the base station may be the first information, or may also be the second information, which is not limited in the embodiment.

Optionally, in a possible implementation manner of the embodiment, before 202, the base station may further send the subframe configuration information.

Specifically, the subframe configuration information is indicated by using a bitmap (bitmap), such as a bitmap 0111001110, where an $N^{th}$ bit indicates an $N^{th}$ subframe, and the N is an integer ranging from 0 to 9. When a value of the $N^{th}$ bit is 0, it indicates the type-1 subframe; when a value of the $N^{th}$ bit is 1, it indicates the type-2 subframe. The bitmap may indicate that a subframe numbered 0, 4, 5 or 9 is a type-1 subframe and a subframe numbered 1, 2, 3, 6, 7, or 8 is a type-2 subframe.

Specifically, the base station may specifically send the subframe configuration information through higher layer signaling or a control channel.

For example, the high layer signaling may be radio resource control (Radio Resource Control, RRC) signaling. Specifically, the subframe configuration information may be carried through an information element (Information Element, IE) in the RRC signaling. The RRC signaling may be RRC signaling in the prior art, such as an RRC connection reconfiguration (RRC CONNECTION RECONFIGURATION) message or the like, which is not limited in the embodiment. The subframe configuration information is carried by extending the IE in the existing RRC signaling, or the RRC signaling may also be different from the existing RRC signaling in the prior art.

For another example, the high layer signaling may be the broadcast message. Specifically, the subframe configuration information may be carried through system information block (System Information Block, SIB) information in the broadcast message. The SIB information may be SIB information in the prior art, such as SIB1 information or SIB2 information, which is not limited in the embodiment. The subframe configuration information is carried by extending the existing SIB information, or the SIB information may also be different from the existing SIB information in the prior art.

For another example, the control channel may be a physical downlink control channel (Physical Downlink Control Channel, PDCCH) or an enhanced PDCCH (Enhanced PDCCH, ePDCCH). Specifically, the base station may specifically send the subframe configuration information to a terminal through the PDCCH or the ePDCCH, or may further send the subframe configuration information to a group to which the terminal belongs through the PDCCH or the ePDCCH.

Optionally, in a possible implementation manner of the embodiment, a position of the type-2 subframe may partially or completely overlap with a position of a multicast/broadcast single frequency network (Multicast/Broadcast Single Frequency Network, MBSFN) subframe, for example, may be one subframe or a combination of several subframes except subframes numbered 0, 4, 5, and 9.

Optionally, in a possible implementation manner of the embodiment, if the terminal has a carrier aggregation (Carrier Aggregation, CA) capability, the terminal may support at least two carriers, that is, the terminal may access a cell corresponding to at least two carriers.

Then, in one possible situation, the first carrier may include all carriers supported by the terminal.

Then, in another possible situation, the first carrier may include partial carriers supported by the terminal, so other carriers supported by the terminal may be NCT carriers. In this case, on the first carrier and the NCT carrier, there is no need to transmit the first CRS in all the subframes, which may save a large number of transmission overheads, thereby improving system throughput.

Optionally, in a possible implementation manner of the embodiment, the type-2 subframe may be used for the base station to transmit the second information including the second CRS. The second CRS does not have a function used for demodulation, but has a function which may be used for synchronization.

It should be noted that, the type-2 subframe transmits, in the system bandwidth, the second information including the second CRS, and besides including the second CRS, the second information may further include but is not limited to control information, a broadcast message, or data.

Because the first CRS is no longer transmitted in the type-2 subframe, other RSs (such as the second CRS) transmitted in the type-2 subframe may not be transmitted in each type-2 subframe; instead, the other RSs may be transmitted according to a configured transmission period (such as 5 milliseconds). Therefore, compared with the type-1 subframe, the type-2 subframe has more transmission resources which may be used to transmit data.

It can be understood that, configuration information of the first CRS may be different from configuration information of the second CRS. For example, the port number of the first CRS is 2, and the port number of the second CRS is 1. For another example, the first CRS may be transmitted in each type-1 subframe, and the transmission period of the second CRS in the type-2 subframe may be 5 milliseconds (ms).

It can be understood that, before 202, the base station may further determine the configuration information of the first CRS and/or the configuration information of the second CRS, which is used to indicate configuration of the first CRS and/or configuration of the second CRS.

Optionally, after the base station determines the configuration information of the first CRS and/or the configuration information of the second CRS, the base station may further send the configuration information of the first CRS and/or the configuration information of the second CRS.

Correspondingly, in 202, the base station may specifically send the information on the first carrier according to the subframe configuration information, and the configuration information of the first CRS and/or the configuration information of the second CRS.

Specifically, the base station may specifically send the configuration information of the first CRS and/or the configuration information of the second CRS through the high layer signaling or the control channel.

For example, the high layer signaling may be the radio resource control (Radio Resource Control, RRC) signaling. Specifically, the configuration information of the first CRS and/or the configuration information of the second CRS may be carried through the information element (Information Element, IE) in the RRC signaling. The RRC signaling may be the RRC signaling in the prior art, such as an RRC connection reconfiguration (RRC CONNECTION RECONFIGURATION) message or the like, which is not limited in the embodiment. The configuration information of the first CRS and/or the configuration information of the second CRS is carried by extending the IE of the existing RRC signaling, or the RRC signaling may also be different from the existing RRC signaling in the prior art.

For another example, the high layer signaling may be the broadcast message. Specifically, the configuration information of the first CRS and/or the configuration information of the second CRS may be carried through the system information block (System Information Block, SIB) information in the broadcast message. The SIB information may be the SIB information in the prior art, such as SIB1 information or SIB2 information, which is not limited in the embodiment. The configuration information of the first CRS and/or the configuration information of the second CRS is carried by extending the existing SIB information, or the SIB information may also be different from the existing SIB information in the prior art.

For another example, the control channel may be the physical downlink control channel (Physical Downlink Control Channel, PDCCH) or the enhanced PDCCH (Enhanced PDCCH, ePDCCH). Specifically, the base station may specifically send the configuration information of the first CRS and/or the configuration information of the second CRS to the terminal through the PDCCH or the ePDCCH, or may further send the configuration information of the first CRS and/or the configuration information of the second CRS to the group to which the terminal belongs through the PDCCH or the ePDCCH.

In the embodiment, the base station determines the subframe configuration information of the first carrier, where the subframe configuration information is used to indicate the type-1 subframe of the first carrier and the type-2 subframe of the first carrier, the type-1 subframe is used for the base station to transmit, in the system bandwidth, the first information including the first CRS, the first CRS is used for demodulation, and the type-2 subframe is not used for the base station to transmit the CRS used for demodulation, so that the base station can send the information on the first carrier according to the subframe configuration information. Because the first carrier is configured with the type-1 subframe corresponding to the non-NCT carrier (that is, the legacy carrier) and the type-2 subframe corresponding to the NCT carrier, the terminal can independently access a first carrier cell, that is, a first carrier cell corresponding to the non-NCT carrier (that is, the legacy carrier) or a first carrier cell corresponding to the NCT carrier, which may avoid a problem that, in a scenario where the terminal only supports one carrier, the terminal cannot access an NCT carrier cell; therefore, the terminal cannot perform communication through the NCT carrier cell.

It should be noted that, for ease of description, the foregoing method embodiments are expressed as a combination of a series of actions. However, it should be understood by persons skilled in the art that the present application is not limited by the described action sequence, because based on the present application, some steps may be performed by adopting other sequences or simultaneously. In addition, it should be understood by persons skilled in the art that the embodiment described in the specification are preferred embodiments, and actions and modules related are not necessarily required in the present application.

In the foregoing embodiments, descriptions of the embodiments are emphasized respectively. For a part of a certain embodiment that is not described in detail, reference may be made to relevant descriptions of other embodiments.

Figure 3:
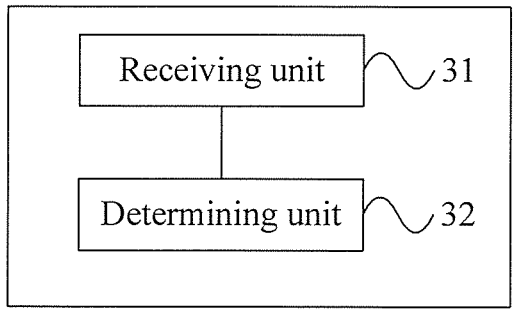
FIG. 3 is a schematic structural diagram of a terminal provided in another embodiment of the present application.

FIG. 3 is a schematic structural diagram of a terminal provided in another embodiment of the present application, and as shown in FIG. 3, the terminal of the embodiment may include a receiving unit 31 and a determining unit 32. The receiving unit 31 is configured to obtain subframe configuration information of a first carrier, and transmit the subframe configuration information to the determining unit 32, where the subframe configuration information is used to indicate a type-1 subframe of the first carrier and a type-2 subframe of the first carrier, the type-1 subframe is used for a base station to transmit, in system bandwidth, first information including a first CRS, the first CRS is used for demodulation, and the type-2 subframe is not used for the base station to transmit a CRS used for the demodulation; the determining unit 32 is configured to determine the type-1 subframe of the first carrier and the type-2 subframe of the first carrier according to the subframe configuration information; and the receiving unit 31 is further configured to receive, according to the type-1 subframe of the first carrier and the type-2 subframe of the first carrier that are determined by a determining unit and on the first carrier, information sent by the base station.

It should be noted that, the type-1 subframe transmits, in the system bandwidth, the first information including the first CRS, and besides including the first CRS, the first information may further include but is not limited to control information, a broadcast message, or data.

It can be understood that, the first carrier is an NCT carrier generated after an existing NCT carrier is improved. According to contents transmitted in the type-1 subframe and the type-2 subframe, the type-1 subframe may correspond to a subframe transmitted in a non-NCT carrier (that is, a legacy carrier), and the type-2 subframe may correspond to a subframe transmitted in the existing NCT carrier.

Optionally, in a possible implementation manner of the embodiment, as for the type-1 subframe, the first information transmitted in the type-1 subframe may include but is not limited to MIB information and/or SIB information; as for the type-2 subframe, second information transmitted in the type-2 subframe does not include the MIB information or the SIB information. That is to say, the receiving unit 31 may specifically receive, in the type-1 subframe of the first carrier determined by the determining unit 32, the MIB information and/or the SIB information sent by the base station, where the MIB information and/or the SIB information can be demodulated by the first CRS; and the determining unit 32 may specifically determine, according to the subframe configuration information, that the second information transmitted in the type-2 subframe does not include the MIB information or the SIB information, and therefore, the receiving unit 31 does not receive, in the type-2 subframe determined by the determining unit 32, the MIB information or the SIB information sent by the base station.

It should be noted that, the information sent by the base station may be the first information, or may also be the second information, which is not limited in the embodiment.

Optionally, in a possible implementation manner of the embodiment, the receiving unit 31 may specifically obtain the subframe configuration information according to pre-configured configuration information, such as a protocol agreement.

Optionally, in a possible implementation manner of the embodiment, the receiving unit 31 may specifically receive the subframe configuration information sent by the base station.

Specifically, the subframe configuration information is indicated by using a bitmap (bitmap), such as a bitmap 0111001110, where an $N^{th}$ bit indicates an $N^{th}$ subframe, and the N is an integer ranging from 0 to 9. When a value of the $N^{th}$ bit is 0, it indicates the type-1 subframe; when a value of the $N^{th}$ bit is 1, it indicates the type-2 subframe. The bitmap may indicate that a subframe numbered 0, 4, 5 or 9 is a type-1 subframe and a subframe numbered 1, 2, 3, 6, 7, or 8 is a type-2 subframe.

Specifically, the receiving unit 31 may specifically receive the subframe configuration information sent by the base station through higher layer signaling or a control channel.

For example, the high layer signaling may be radio resource control (Radio Resource Control, RRC) signaling. Specifically, the subframe configuration information may be carried through an information element (Information Element, IE) in the RRC signaling. The RRC signaling may be RRC signaling in the prior art, such as an RRC connection reconfiguration (RRC CONNECTION RECONFIGURATION) message or the like, which is not limited in the embodiment. The subframe configuration information is carried by extending the IE in the existing RRC signaling, or the RRC signaling may also be different from the existing RRC signaling in the prior art.

For another example, the high layer signaling may be the broadcast message. Specifically, the subframe configuration information may be carried through system information block (System Information Block, SIB) information in the broadcast message. The SIB information may be SIB information in the prior art, such as SIB1 information or SIB2 information, which is not limited in the embodiment. The subframe configuration information is carried by extending the existing SIB information, or the SIB information may also be different from the existing SIB information in the prior art.

For another example, the control channel may be a physical downlink control channel (Physical Downlink Control Channel, PDCCH) or an enhanced PDCCH (Enhanced PDCCH, ePDCCH). Specifically, the receiving unit 31 may receive the subframe configuration information sent by the base station to the terminal through the PDCCH or the ePDCCH, or may further receive the subframe configuration information sent by the base station to a group to which the terminal belongs through the PDCCH or the ePDCCH.

Optionally, in a possible implementation manner of the embodiment, a position of the type-2 subframe may partially or completely overlap with a position of a multicast/broadcast single frequency network (Multicast/Broadcast Single Frequency Network, MBSFN) subframe, for example, may be one subframe or a combination of several subframes except subframes numbered 0, 4, 5, and 9.

Optionally, in a possible implementation manner of the embodiment, if the terminal has a carrier aggregation (Carrier Aggregation, CA) capability, the terminal may support at least two carriers, that is, the terminal may access a cell corresponding to at least two carriers.

Then, in one possible situation, the first carrier may include all carriers supported by the terminal.

Then, in another possible situation, the first carrier may include partial carriers supported by the terminal, so other carriers supported by the terminal may be NCT carriers. In this case, on the first carrier and the NCT carrier, there is no need to transmit the first CRS in all the subframes, which may save a large number of transmission overheads, thereby improving system throughput.

Optionally, in a possible implementation manner of the embodiment, the type-2 subframe may be used for the base station to transmit the second information including the second CRS. The second CRS does not have a function used for demodulation, but has a function which may be used for synchronization.

It should be noted that, the type-2 subframe transmits, in the system bandwidth, the second information including the second CRS, and besides including the second CRS, the second information may further include but is not limited to control information, a broadcast message, or data.

Because the first CRS is no longer transmitted in the type-2 subframe, other RSs (such as the second CRS) transmitted in the type-2 subframe may not be transmitted in each type-2 subframe; instead, the other RSs may be transmitted according to a configured transmission period (such as 5 milliseconds). Therefore, compared with the type-1 subframe, the type-2 subframe has more transmission resources which may be used to transmit data.

It can be understood that, configuration information of the first CRS may be different from configuration information of the second CRS. For example, the port number of the first CRS is 2, and the port number of the second CRS is 1. For another example, the first CRS may be transmitted in each type-1 subframe, and the transmission period of the second CRS in the type-2 subframe may be 5 milliseconds (ms).

It can be understood that, the receiving unit 31 may further obtain the configuration information of the first CRS and/or the configuration information of the second CRS, where the configuration information of the first CRS and/or the configuration information of the second CRS is used to indicate configuration of the first CRS and/or configuration of the second CRS.

Correspondingly, the receiving unit 31 may specifically receive, according to the type-1 subframe of the first carrier and the type-2 subframe of the first carrier that are determined by the determining unit 32, and the configuration information of the first CRS or the configuration information of the second CRS, the information sent by the base station.

Specifically, the receiving unit 31 may specifically obtain the configuration information of the first CRS and/or the configuration information of the second CRS according to the preconfigured configuration information, such as a protocol agreement.

Specifically, the receiving unit 31 may specifically receive the configuration information of the first CRS and/or the configuration information of the second CRS, which is sent by the base station. Specifically, the receiving unit 31 may specifically receive the configuration information of the first CRS and/or the configuration information of the second CRS, which is sent by the base station through the high layer signaling and/or the control channel.

For example, the high layer signaling may be the radio resource control (Radio Resource Control, RRC) signaling. Specifically, the configuration information of the first CRS and/or the configuration information of the second CRS may be carried through the information element (Information Element, IE) in the RRC signaling. The RRC signaling may be the RRC signaling in the prior art, such as an RRC connection reconfiguration (RRC CONNECTION RECONFIGURATION) message or the like, which is not limited in the embodiment. The configuration information of the first CRS and/or the configuration information of the second CRS is carried by extending the IE of the existing RRC signaling, and/or the RRC signaling may also be different from the existing RRC signaling in the prior art.

For another example, the high layer signaling may be the broadcast message. Specifically, the configuration information of the first CRS and/or the configuration information of the second CRS may be carried through the system information block (System Information Block, SIB) information in the broadcast message. The SIB information may be the SIB information in the prior art, such as SIB1 information or SIB2 information, which is not limited in the embodiment. The configuration information of the first CRS and/or the configuration information of the second CRS is carried by extending the existing SIB information, or the SIB information may also be different from the existing SIB information in the prior art.

For another example, the control channel may be the physical downlink control channel (Physical Downlink Control Channel, PDCCH) or the enhanced PDCCH (Enhanced PDCCH, ePDCCH). Specifically, the terminal may receive the configuration information of the first CRS and/or the configuration information of the second CRS, which is sent by the base station to the terminal through the PDCCH or the ePDCCH, and/or may further receive the configuration information of the first CRS and/or the configuration information of the second CRS, which is sent by the base station to the group to which the terminal belongs through the PDCCH and/or the ePDCCH.

The terminal provided in the embodiment is configured to correspondingly execute the method of the embodiment as shown in FIG. 1, and details of the embodiment as shown in FIG. 1 which have been described are not described herein again.

In the embodiment, the terminal obtains the subframe configuration information of the first carrier by using a receiving unit, where the subframe configuration information is used to indicate the type-1 subframe of the first carrier and the type-2 subframe of the first carrier, the type-1 subframe is used for the base station to transmit, in the system bandwidth, the first information including the first CRS, the first CRS is used for demodulation, and the type-2 subframe is not used for the base station to transmit the CRS used for demodulation, and then a determining unit determines, according to the subframe configuration information, the type-1 subframe of the first carrier and the type-2 subframe of the first carrier, so that the receiving unit can receive, on the first carrier, the information sent by the base station. Because the first carrier is configured with the type-1 subframe corresponding to the non-NCT carrier (that is, the legacy carrier) and the type-2 subframe corresponding to the NCT carrier, the terminal can independently access a first carrier cell, that is, a first carrier cell corresponding to the non-NCT carrier (that is, the legacy carrier) or a first carrier cell corresponding to the NCT carrier, which may avoid a problem that, in a scenario where the terminal only supports one carrier, the terminal cannot access an NCT carrier cell; therefore, the terminal cannot perform communication through the NCT carrier cell.

Figure 4:
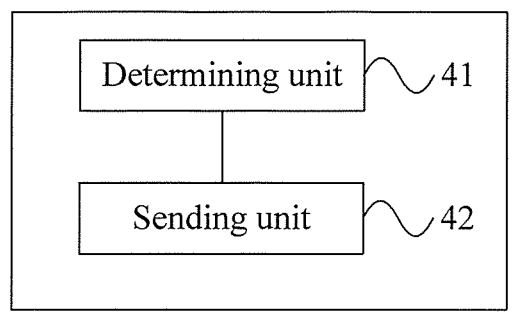
FIG. 4 is a schematic structural diagram of a base station provided in another embodiment of the present application.

FIG. 4 is a schematic structural diagram of a base station provided in another embodiment of the present application, and as shown in FIG. 4, the base station of the embodiment may include a determining unit 41 and a sending unit 42. The determining unit 41 is configured to determine subframe configuration information of a first carrier, and transmit the subframe configuration information to the sending unit 42, where the subframe configuration information is used to indicate a type-1 subframe of the first carrier and a type-2 subframe of the first carrier, the type-1 subframe is used for the base station to transmit, in system bandwidth, first information including a first CRS, the first CRS is used for demodulation, and the type-2 subframe is not used for the base station to transmit a CRS used for demodulation; and the sending unit 42 is configured to send information on the first carrier according to the subframe configuration information.

It should be noted that, the type-1 subframe transmits, in the system bandwidth, the first information including the first CRS, and besides including the first CRS, the first information may further include but is not limited to control information, a broadcast message, or data.

It can be understood that, the first carrier is an NCT carrier generated after an existing NCT carrier is improved. According to contents transmitted in the type-1 subframe and the type-2 subframe, the type-1 subframe may correspond to a subframe transmitted in a non-NCT carrier (that is, a legacy carrier), and the type-2 subframe may correspond to a subframe transmitted in the existing NCT carrier.

Optionally, in a possible implementation manner of the embodiment, as for the type-1 subframe, the first information transmitted in the type-1 subframe may include but is not limited to MIB information and/or SIB information; as for the type-2 subframe, second information transmitted in the type-2 subframe does not include the MIB information or the SIB information. That is to say, the sending unit 42 may specifically send the MIB information and/or the SIB information in the type-1 subframe of the first carrier according to the subframe configuration information, where the MIB information and/or the SIB information can be demodulated by the first CRS; and the sending unit 42 may specifically determine, according to the subframe configuration information, that the second information transmitted in the type-2 subframe does not include the MIB information or the SIB information, and therefore, the sending unit 42 does not send the MIB information or the SIB information in the type-2 subframe.

It should be noted that, the information sent by the base station may be the first information, or may also be the second information, which is not limited in the embodiment.

Optionally, in a possible implementation manner of the embodiment, the sending unit 42 may further send the subframe configuration information.

Specifically, the subframe configuration information is indicated by using a bitmap (bitmap), such as a bitmap 0111001110, where an $N^{th}$ bit indicates an $N^{th}$ subframe, and the N is an integer ranging from 0 to 9. When a value of the $N^{th}$ bit is 0, it indicates the type-1 subframe; when a value of the $N^{th}$ bit is 1, it indicates the type-2 subframe. The bitmap may indicate that a subframe numbered 0, 4, 5 or 9 is a type-1 subframe and a subframe numbered 1, 2, 3, 6, 7, or 8 is a type-2 subframe.

Specifically, the sending unit 42 may specifically send the subframe configuration information through higher layer signaling or a control channel.

For example, the high layer signaling may be radio resource control (Radio Resource Control, RRC) signaling. Specifically, the subframe configuration information may be carried through an information element (Information Element, IE) in the RRC signaling. The RRC signaling may be RRC signaling in the prior art, such as an RRC connection reconfiguration (RRC CONNECTION RECONFIGURATION) message or the like, which is not limited in the embodiment. The subframe configuration information is carried by extending the IE in the existing RRC signaling, or the RRC signaling may also be different from the existing RRC signaling in the prior art.

For another example, the high layer signaling may be the broadcast message. Specifically, the subframe configuration information may be carried through system information block (System Information Block, SIB) information in the broadcast message. The SIB information may be SIB information in the prior art, such as SIB1 information or SIB2 information, which is not limited in the embodiment. The subframe configuration information is carried by extending the existing SIB information, or the SIB information may also be different from the existing SIB information in the prior art.

For another example, the control channel may be a physical downlink control channel (Physical Downlink Control Channel, PDCCH) or an enhanced PDCCH (Enhanced PDCCH, ePDCCH). Specifically, the sending unit 42 may specifically send the subframe configuration information to a terminal through the PDCCH or the ePDCCH, or may further send the subframe configuration information to a group to which the terminal belongs through the PDCCH or the ePDCCH.

Optionally, in a possible implementation manner of the embodiment, a position of the type-2 subframe may partially or completely overlap with a position of a multicast/broadcast single frequency network (Multicast/Broadcast Single Frequency Network, MBSFN) subframe, for example, may be one subframe or a combination of several subframes except subframes numbered 0, 4, 5, and 9.

Optionally, in a possible implementation manner of the embodiment, if the terminal has a carrier aggregation (Carrier Aggregation, CA) capability, the terminal may support at least two carriers, that is, the terminal may access a cell corresponding to at least two carriers.

Then, in one possible situation, the first carrier may include all carriers supported by the terminal.

Then, in another possible situation, the first carrier may include partial carriers supported by the terminal, so other carriers supported by the terminal may be NCT carriers. In this case, on the first carrier and the NCT carrier, there is no need to transmit the first CRS in all the subframes, which may save a large number of transmission overheads, thereby improving system throughput.

Optionally, in a possible implementation manner of the embodiment, the type-2 subframe may be used for the base station to transmit the second information including the second CRS. The second CRS does not have a function used for demodulation, but has a function which may be used for synchronization.

It should be noted that, the type-2 subframe transmits, in the system bandwidth, the second information including the second CRS, and besides including the second CRS, the second information may further include but is not limited to control information, a broadcast message, or data.

Because the first CRS is no longer transmitted in the type-2 subframe, other RSs (such as the second CRS) transmitted in the type-2 subframe may not be transmitted in each type-2 subframe; instead, the other RSs may be transmitted according to a configured transmission period (such as 5 milliseconds). Therefore, compared with the type-1 subframe, the type-2 subframe has more transmission resources which may be used to transmit data.

It can be understood that, configuration information of the first CRS may be different from configuration information of the second CRS. For example, the port number of the first CRS is 2, and the port number of the second CRS is 1. For another example, the first CRS may be transmitted in each type-1 subframe, and the transmission period of the second CRS in the type-2 subframe may be 5 milliseconds (ms).

It can be understood that, the determining unit 41 may further determine the configuration information of the first CRS and/or the configuration information of the second CRS, and transmit the configuration information of the first CRS and/or the configuration information of the second CRS to the sending unit 42, where the configuration information of the first CRS and/or the configuration information of the second CRS is used to indicate configuration of the first CRS and/or configuration of the second CRS.

Correspondingly, the sending unit 42 may specifically send the information on the first carrier according to the subframe configuration information, and the configuration information of the first CRS or the configuration information of the second CRS.

Correspondingly, the sending unit 42 may further send the configuration information of the first CRS and/or the configuration information of the second CRS.

Specifically, the sending unit 42 may specifically send the configuration information of the first CRS and/or the configuration information of the second CRS through the high layer signaling or the control channel.

For example, the high layer signaling may be the radio resource control (Radio Resource Control, RRC) signaling. Specifically, the configuration information of the first CRS and/or the configuration information of the second CRS may be carried through the information element (Information Element, IE) in the RRC signaling. The RRC signaling may be the RRC signaling in the prior art, such as an RRC connection reconfiguration (RRC CONNECTION RECONFIGURATION) message or the like, which is not limited in the embodiment. The configuration information of the first CRS and/or the configuration information of the second CRS is carried by extending the IE of the existing RRC signaling, or the RRC signaling may also be different from the existing RRC signaling in the prior art.

For another example, the high layer signaling may be the broadcast message. Specifically, the configuration information of the first CRS and/or the configuration information of the second CRS may be carried through the system information block (System Information Block, SIB) information in the broadcast message. The SIB information may be the SIB information in the prior art, such as SIB1 information or SIB2 information, which is not limited in the embodiment. The configuration information of the first CRS and/or the configuration information of the second CRS is carried by extending the existing SIB information, or the SIB information may also be different from the existing SIB information in the prior art.

For another example, the control channel may be the physical downlink control channel (Physical Downlink Control Channel, PDCCH) or the enhanced PDCCH (Enhanced PDCCH, ePDCCH). Specifically, the sending unit 42 may specifically send the configuration information of the first CRS and/or the configuration information of the second CRS to the terminal through the PDCCH or the ePDCCH, or may further send the configuration information of the first CRS and/or the configuration information of the second CRS to the group to which the terminal belongs through the PDCCH or the ePDCCH.

The base station provided in the embodiment is configured to correspondingly execute the method of the embodiment as shown in FIG. 2, and details of the embodiment as shown in FIG. 2 which have been described are not described herein again.

In the embodiment, the base station determines the subframe configuration information of the first carrier by using a determining unit, where the subframe configuration information is used to indicate the type-1 subframe of the first carrier and the type-2 subframe of the first carrier, the type-1 subframe is used for the base station to transmit, in the system bandwidth, the first information including the first CRS, the first CRS is used for demodulation, and the type-2 subframe is not used for the base station to transmit the CRS used for demodulation, so that a sending unit can send the information on the first carrier according to the subframe configuration information. Because the first carrier is configured with the type-1 subframe corresponding to the non-NCT carrier (that is, the legacy carrier) and the type-2 subframe corresponding to the NCT carrier, the terminal can independently access a first carrier cell, that is, a first carrier cell corresponding to the non-NCT carrier (that is, the legacy carrier) or a first carrier cell corresponding to the NCT carrier, which may avoid a problem that, in a scenario where the terminal only supports one carrier, the terminal cannot access an NCT carrier cell; therefore, the terminal cannot perform communication through the NCT carrier cell.

Figure 5:
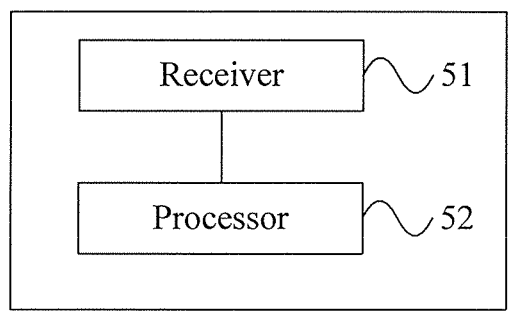
FIG. 5 is a schematic structural diagram of a terminal provided in another embodiment of the present application.

FIG. 5 is a schematic structural diagram of a terminal provided in another embodiment of the present application, and as shown in FIG. 5, the terminal of the embodiment may include a receiver 51 and a processor 52. The receiver 51 is configured to obtain subframe configuration information of a first carrier, and transmit the subframe configuration information to the processor 52, where the subframe configuration information is used to indicate a type-1 subframe of the first carrier and a type-2 subframe of the first carrier, the type-1 subframe is used for a base station to transmit, in system bandwidth, first information including a first CRS, the first CRS is used for demodulation, and the type-2 subframe is not used for the base station to transmit a CRS used for the demodulation; the processor 52 is configured to determine the type-1 subframe of the first carrier and the type-2 subframe of the first carrier according to the subframe configuration information; and the receiver 51 is further configured to receive, according to the type-1 subframe of the first carrier and the type-2 subframe of the first carrier that are determined by the processor 52 and on the first carrier, information sent by the base station.

It should be noted that, the type-1 subframe transmits, in the system bandwidth, the first information including the first CRS, and besides including the first CRS, the first information may further include but is not limited to control information, a broadcast message, or data.

It can be understood that, the first carrier is an NCT carrier generated after an existing NCT carrier is improved. According to contents transmitted in the type-1 subframe and the type-2 subframe, the type-1 subframe may correspond to a subframe transmitted in a non-NCT carrier (that is, a legacy carrier), and the type-2 subframe may correspond to a subframe transmitted in the existing NCT carrier.

Optionally, in a possible implementation manner of the embodiment, as for the type-1 subframe, the first information transmitted in the type-1 subframe may include but is not limited to MIB information and/or SIB information; as for the type-2 subframe, second information transmitted in the type-2 subframe does not include the MIB information or the SIB information. That is to say, the receiver 51 may specifically receive, in the type-1 subframe of the first carrier determined by the processor 52, the MIB information and/or the SIB information sent by the base station, where the MIB information and/or the SIB information can be demodulated by the first CRS; and the processor 52 may specifically determine, according to the subframe configuration information, that the second information transmitted in the type-2 subframe does not include the MIB information or the SIB information, and therefore, the receiver 51 does not receive, in the type-2 subframe determined by the processor 52, the MIB information or the SIB information sent by the base station.

It should be noted that, the information sent by the base station may be the first information, or may also be the second information, which is not limited in the embodiment.

Optionally, in a possible implementation manner of the embodiment, the receiver 51 may specifically obtain the subframe configuration information according to preconfigured configuration information, such as a protocol agreement.

Optionally, in a possible implementation manner of the embodiment, the receiver 51 may specifically receive the subframe configuration information sent by the base station.

Specifically, the subframe configuration information is indicated by using a bitmap (bitmap), such as a bitmap 0111001110, where an $N^{th}$ bit indicates an $N^{th}$ subframe, and the N is an integer ranging from 0 to 9. When a value of the $N^{th}$ bit is 0, it indicates the type-1 subframe; when a value of the $N^{th}$ bit is 1, it indicates the type-2 subframe. The bitmap may indicate that a subframe numbered 0, 4, 5 or 9 is a type-1 subframe and a subframe numbered 1, 2, 3, 6, 7, or 8 is a type-2 subframe.

Specifically, the receiver 51 may specifically receive the subframe configuration information sent by the base station through higher layer signaling or a control channel.

For example, the high layer signaling may be radio resource control (Radio Resource Control, RRC) signaling. Specifically, the subframe configuration information may be carried through an information element (Information Element, IE) in the RRC signaling. The RRC signaling may be RRC signaling in the prior art, such as an RRC connection reconfiguration (RRC CONNECTION RECONFIGURATION) message or the like, which is not limited in the embodiment. The subframe configuration information is carried by extending the IE in the existing RRC signaling, or the RRC signaling may also be different from the existing RRC signaling in the prior art.

For another example, the high layer signaling may be the broadcast message. Specifically, the subframe configuration information may be carried through system information block (System Information Block, SIB) information in the broadcast message. The SIB information may be SIB information in the prior art, such as SIB1 information or SIB2 information, which is not limited in the embodiment. The subframe configuration information is carried by extending the existing SIB information, or the SIB information may also be different from the existing SIB information in the prior art.

For another example, the control channel may be a physical downlink control channel (Physical Downlink Control Channel, PDCCH) or an enhanced PDCCH (Enhanced PDCCH, ePDCCH). Specifically, the receiver 51 may receive the subframe configuration information sent by the base station to the terminal through the PDCCH or the ePDCCH, or may further receive the subframe configuration information sent by the base station to a group to which the terminal belongs through the PDCCH or the ePDCCH.

Optionally, in a possible implementation manner of the embodiment, a position of the type-2 subframe may partially or completely overlap with a position of a multicast/broadcast single frequency network (Multicast/Broadcast Single Frequency Network, MBSFN) subframe, for example, may be one subframe or a combination of several subframes except subframes numbered 0, 4, 5, and 9.

Optionally, in a possible implementation manner of the embodiment, if the terminal has a carrier aggregation (Carrier Aggregation, CA) capability, the terminal may support at least two carriers, that is, the terminal may access a cell corresponding to at least two carriers.

Then, in one possible situation, the first carrier may include all carriers supported by the terminal.

Then, in another possible situation, the first carrier may include partial carriers supported by the terminal, so other carriers supported by the terminal may be NCT carriers. In this case, on the first carrier and the NCT carrier, there is no need to transmit the first CRS in all the subframes, which may save a large number of transmission overheads, thereby improving system throughput.

Optionally, in a possible implementation manner of the embodiment, the type-2 subframe may be used for the base station to transmit the second information including the second CRS. The second CRS does not have a function used for demodulation, but has a function which may be used for synchronization.

It should be noted that, the type-2 subframe transmits, in the system bandwidth, the second information including the second CRS, and besides including the second CRS, the second information may further include but is not limited to control information, a broadcast message, or data.

Because the first CRS is no longer transmitted in the type-2 subframe, other RSs (such as the second CRS) transmitted in the type-2 subframe may not be transmitted in each type-2 subframe; instead, the other RSs may be transmitted according to a configured transmission period (such as 5 milliseconds). Therefore, compared with the type-1 subframe, the type-2 subframe has more transmission resources which may be used to transmit data.

It can be understood that, configuration information of the first CRS may be different from configuration information of the second CRS. For example, the port number of the first CRS is 2, and the port number of the second CRS is 1. For another example, the first CRS may be transmitted in each type-1 subframe, and the transmission period of the second CRS in the type-2 subframe may be 5 milliseconds (ms).

It can be understood that, the receiver 51 may further obtain the configuration information of the first CRS and/or the configuration information of the second CRS, where the configuration information of the first CRS and/or the configuration information of the second CRS is used to indicate configuration of the first CRS and/or configuration of the second CRS.

Correspondingly, the receiver 51 may specifically receive, according to the type-1 subframe of the first carrier and the type-2 subframe of the first carrier that are determined by the processor 52, and the configuration information of the first CRS or the configuration information of the second CRS, the information sent by the base station.

Specifically, the receiver 51 may specifically obtain the configuration information of the first CRS and/or the configuration information of the second CRS according to the preconfigured configuration information, such as a protocol agreement.

Specifically, the receiver 51 may specifically receive the configuration information of the first CRS and/or the configuration information of the second CRS, which is sent by the base station. Specifically, the receiver 51 may specifically receive the configuration information of the first CRS and/or the configuration information of the second CRS, which is sent by the base station through the high layer signaling or the control channel.

For example, the high layer signaling may be the radio resource control (Radio Resource Control, RRC) signaling. Specifically, the configuration information of the first CRS and/or the configuration information of the second CRS may be carried through the information element (Information Element, IE) in the RRC signaling. The RRC signaling may be the RRC signaling in the prior art, such as an RRC connection reconfiguration (RRC CONNECTION RECONFIGURATION) message or the like, which is not limited in the embodiment. The configuration information of the first CRS and/or the configuration information of the second CRS is carried by extending the IE of the existing RRC signaling, or the RRC signaling may also be different from the existing RRC signaling in the prior art.

For another example, the high layer signaling may be the broadcast message. Specifically, the configuration information of the first CRS and/or the configuration information of the second CRS may be carried through the system information block (System Information Block, SIB) information in the broadcast message. The SIB information may be the SIB information in the prior art, such as SIB1 information or SIB2 information, which is not limited in the embodiment. The configuration information of the first CRS and/or the configuration information of the second CRS is carried by extending the existing SIB information, or the SIB information may also be different from the existing SIB information in the prior art.

For another example, the control channel may be the physical downlink control channel (Physical Downlink Control Channel, PDCCH) or the enhanced PDCCH (Enhanced PDCCH, ePDCCH). Specifically, the terminal may receive the configuration information of the first CRS and/or the configuration information of the second CRS, which is sent by the base station to the terminal through the PDCCH or the ePDCCH, or may further receive the configuration information of the first CRS and/or the configuration information of the second CRS, which is sent by the base station to the group to which the terminal belongs through the PDCCH or the ePDCCH.

The terminal provided in the embodiment is configured to correspondingly execute the method of the embodiment as shown in FIG. 1, and details of the embodiment as shown in FIG. 1 which have been described are not described herein again.

In the embodiment, the terminal obtains the subframe configuration information of the first carrier by using a receiver, where the subframe configuration information is used to indicate the type-1 subframe of the first carrier and the type-2 subframe of the first carrier, the type-1 subframe is used for the base station to transmit, in the system bandwidth, the first information including the first CRS, the first CRS is used for demodulation, and the type-2 subframe is not used for the base station to transmit the CRS used for demodulation, so that a processor determines the type-1 subframe of the first carrier and the type-2 subframe of the first carrier according to the subframe configuration information, so that the receiver can receive, on the first carrier, the information sent by the base station. Because the first carrier is configured with the type-1 subframe corresponding to the non-NCT carrier (that is, the legacy carrier) and the type-2 subframe corresponding to the NCT carrier, the terminal can independently access a first carrier cell, that is, a first carrier cell corresponding to the non-NCT carrier (that is, the legacy carrier) or a first carrier cell corresponding to the NCT carrier, which may avoid a problem that, in a scenario where the terminal only supports one carrier, the terminal cannot access an NCT carrier cell; therefore, the terminal cannot perform communication through the NCT carrier cell.

Figure 6:
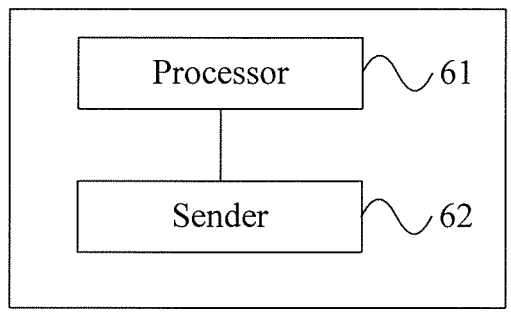
FIG. 6 is a schematic structural diagram of a base station provided in another embodiment of the present application.

FIG. 6 is a schematic structural diagram of a base station provided in another embodiment of the present application, and as shown in FIG. 6, the base station of the embodiment may include a processor 61 and a sender 62. The processor 61 is configured to determine subframe configuration information of a first carrier, and transmit the subframe configuration information to the sender 62, where the subframe configuration information is used to indicate a type-1 subframe of the first carrier and a type-2 subframe of the first carrier, the type-1 subframe is used for the base station to transmit, in system bandwidth, first information including a first CRS, the first CRS is used for demodulation, and the type-2 subframe is not used for the base station to transmit a CRS used for demodulation; and the sender 62 is configured to send information on the first carrier according to the subframe configuration information.

It should be noted that, the type-1 subframe transmits, in the system bandwidth, the first information including the first CRS, and besides including the first CRS, the first information may further include but is not limited to control information, a broadcast message, or data.

It can be understood that, the first carrier is an NCT carrier generated after an existing NCT carrier is improved. According to contents transmitted in the type-1 subframe and the type-2 subframe, the type-1 subframe may correspond to a subframe transmitted in a non-NCT carrier (that is, a legacy carrier), and the type-2 subframe may correspond to a subframe transmitted in the existing NCT carrier.

Optionally, in a possible implementation manner of the embodiment, as for the type-1 subframe, the first information transmitted in the type-1 subframe may include but is not limited to MIB information and/or SIB information; as for the type-2 subframe, second information transmitted in the type-2 subframe does not include the MIB information or the SIB information. That is to say, the sender may specifically send the MIB information and/or the SIB information in the type-1 subframe of the first carrier according to the subframe configuration information, where the MIB information and/or the SIB information can be demodulated by the first CRS; and the sender 62 may specifically determine, according to the subframe configuration information, that the second information transmitted in the type-2 subframe does not include the MIB information or the SIB information, and therefore, the sender 62 does not send the MIB information or the SIB information in the type-2 subframe.

It should be noted that, the information sent by the base station may be the first information, or may also be the second information, which is not limited in the embodiment.

Optionally, in a possible implementation manner of the embodiment, the sender 62 may further send the subframe configuration information.

Specifically, the subframe configuration information is indicated by using a bitmap (bitmap), such as a bitmap 0111001110, where an $N^{th}$ bit indicates an $N^{th}$ subframe, and the N is an integer ranging from 0 to 9. When a value of the $N^{th}$ bit is 0, it indicates the type-1 subframe; when a value of the $N^{th}$ bit is 1, it indicates the type-2 subframe. The bitmap may indicate that a subframe numbered 0, 4, 5 or 9 is a type-1 subframe and a subframe numbered 1, 2, 3, 6, 7, or 8 is a type-2 subframe.

Specifically, the sender 62 may specifically send the subframe configuration information through higher layer signaling or a control channel.

For example, the high layer signaling may be radio resource control (Radio Resource Control, RRC) signaling. Specifically, the subframe configuration information may be carried through an information element (Information Element, IE) in the RRC signaling. The RRC signaling may be RRC signaling in the prior art, such as an RRC connection reconfiguration (RRC CONNECTION RECONFIGURATION) message or the like, which is not limited in the embodiment. The subframe configuration information is carried by extending the IE in the existing RRC signaling, or the RRC signaling may also be different from the existing RRC signaling in the prior art.

For another example, the high layer signaling may be the broadcast message. Specifically, the subframe configuration information may be carried through system information block (System Information Block, SIB) information in the broadcast message. The SIB information may be SIB information in the prior art, such as SIB1 information or SIB2 information, which is not limited in the embodiment. The subframe configuration information is carried by extending the existing SIB information, or the SIB information may also be different from the existing SIB information in the prior art.

For another example, the control channel may be a physical downlink control channel (Physical Downlink Control Channel, PDCCH) or an enhanced PDCCH (Enhanced PDCCH, ePDCCH). Specifically, the sender 62 may specifically send the subframe configuration information to a terminal through the PDCCH or the ePDCCH, or may further send the subframe configuration information to a group to which the terminal belongs through the PDCCH or the ePDCCH.

Optionally, in a possible implementation manner of the embodiment, a position of the type-2 subframe may partially or completely overlap with a position of a multicast/broadcast single frequency network (Multicast/Broadcast Single Frequency Network, MBSFN) subframe, for example, may be one subframe or a combination of several subframes except subframes numbered 0, 4, 5, and 9.

Optionally, in a possible implementation manner of the embodiment, if the terminal has a carrier aggregation (Carrier Aggregation, CA) capability, the terminal may support at least two carriers, that is, the terminal may access a cell corresponding to at least two carriers.

Then, in one possible situation, the first carrier may include all carriers supported by the terminal.

Then, in another possible situation, the first carrier may include partial carriers supported by the terminal, so other carriers supported by the terminal may be NCT carriers. In this case, on the first carrier and the NCT carrier, there is no need to transmit the first CRS in all the subframes, which may save a large number of transmission overheads, thereby improving system throughput.

Optionally, in a possible implementation manner of the embodiment, the type-2 subframe may be used for the base station to transmit the second information including the second CRS. The second CRS does not have a function used for demodulation, but has a function which may be used for synchronization.

It should be noted that, the type-2 subframe transmits, in the system bandwidth, the second information including the second CRS, and besides including the second CRS, the second information may further include but is not limited to control information, a broadcast message, or data.

Because the first CRS is no longer transmitted in the type-2 subframe, other RSs (such as the second CRS) transmitted in the type-2 subframe may not be transmitted in each type-2 subframe; instead, the other RSs may be transmitted according to a configured transmission period (such as 5 milliseconds). Therefore, compared with the type-1 subframe, the type-2 subframe has more transmission resources which may be used to transmit data.

It can be understood that, configuration information of the first CRS may be different from configuration information of the second CRS. For example, the port number of the first CRS is 2, and the port number of the second CRS is 1. For another example, the first CRS may be transmitted in each type-1 subframe, and the transmission period of the second CRS in the type-2 subframe may be 5 milliseconds (ms).

It can be understood that, the processor 61 may further determine the configuration information of the first CRS and/or the configuration information of the second CRS, and transmit the configuration information of the first CRS and/or the configuration information of the second CRS to the sender 62, where the configuration information of the first CRS and/or the configuration information of the second CRS is used to indicate configuration of the first CRS and/or configuration of the second CRS.

Correspondingly, the sender 62 may specifically send the information on the first carrier according to the subframe configuration information, and the configuration information of the first CRS or the configuration information of the second CRS.

Correspondingly, the sender 62 may further send the configuration information of the first CRS and/or the configuration information of the second CRS.

Specifically, the sender 62 may specifically send the configuration information of the first CRS and/or the configuration information of the second CRS through the high layer signaling and/or the control channel.

For example, the high layer signaling may be the radio resource control (Radio Resource Control, RRC) signaling. Specifically, the configuration information of the first CRS and/or the configuration information of the second CRS may be carried through the information element (Information Element, IE) in the RRC signaling. The RRC signaling may be the RRC signaling in the prior art, such as an RRC connection reconfiguration (RRC CONNECTION RECONFIGURATION) message or the like, which is not limited in the embodiment. The configuration information of the first CRS and/or the configuration information of the second CRS is carried by extending the IE of the existing RRC signaling, or the RRC signaling may also be different from the existing RRC signaling in the prior art.

For another example, the high layer signaling may be the broadcast message. Specifically, the configuration information of the first CRS and/or the configuration information of the second CRS may be carried through the system information block (System Information Block, SIB) information in the broadcast message. The SIB information may be the SIB information in the prior art, such as SIB1 information or SIB2 information, which is not limited in the embodiment. The configuration information of the first CRS and/or the configuration information of the second CRS is carried by extending the existing SIB information, or the SIB information may also be different from the existing SIB information in the prior art.

For another example, the control channel may be a physical downlink control channel (Physical Downlink Control Channel, PDCCH) or an enhanced PDCCH (Enhanced PDCCH, ePDCCH). Specifically, the sender 62 may specifically send the configuration information of the first CRS and/or the configuration information of the second CRS to the terminal through the PDCCH or the ePDCCH, or may further send the configuration information of the first CRS and/or the configuration information of the second CRS to the group to which the terminal belongs through the PDCCH or the ePDCCH.

The base station provided in the embodiment is configured to correspondingly execute the method of the embodiment as shown in FIG. 2, and details of the embodiment as shown in FIG. 2 which have been described are not described herein again.

In the embodiment, the base station determines the subframe configuration information of the first carrier by using a processor, where the subframe configuration information is used to indicate the type-1 subframe of the first carrier and the type-2 subframe of the first carrier, the type-1 subframe is used for the base station to transmit, in the system bandwidth, the first information including the first carrier, the first CRS is used for demodulation, and the type-2 subframe is not used for the base station to transmit the CRS used for demodulation, so that a sender can send the information on the first carrier according to the subframe configuration information. Because the first carrier is configured with the type-1 subframe corresponding to the non-NCT carrier (that is, the legacy carrier) and the type-2 subframe corresponding to the NCT carrier, the terminal can independently access a first carrier cell, that is, a first carrier cell corresponding to the non-NCT carrier (that is, the legacy carrier) or a first carrier cell corresponding to the NCT carrier, which may avoid a problem that, in a scenario where the terminal only supports one carrier, the terminal cannot access an NCT carrier cell; therefore, the terminal cannot perform communication through the NCT carrier cell.

It may be clearly understood by a person skilled in the art that, for the purpose of convenient and brief description, a detailed working process of the foregoing system, apparatus, and unit may refer to the corresponding process in the foregoing method embodiments, and the details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Apart or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented through hardware, or may also be implemented in a form of hardware plus a software functional module.

The integrated unit implemented in a form of software functional unit may be stored in a computer readable storage medium. The foregoing software functional unit is stored in a storage medium, and includes several instructions for instructing a computer device (which may be a personal computer, a server, or a network device) or a processor (processor) to perform a part of the steps of the methods described in the embodiments of the present application. The foregoing storage medium includes: any medium that can store program codes, such as a USB flash disk, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present application other than limiting the present application. Although the present application is described in detail with reference to the foregoing embodiments, a person of ordinary skill in the art should understand that he may still make modifications to the technical solutions described in the foregoing embodiments, or make equivalent replacements to some technical features thereof, without departing from the spirit and scope of the technical solutions of the embodiments of the application.

What is claimed is:

1. A method for transmitting information, the method comprising:
    obtaining, by a terminal, subframe configuration information of a first carrier, wherein the subframe configuration information is used to indicate a type-1 subframe of the first carrier and a type-2 subframe of the first carrier,
    wherein the type-1 subframe is used by a base station to transmit (i) master information block (MIB) information and/or system information block (SIB) information, and (ii) first information including a first cell-specific reference signal (CRS),
    wherein the first CRS is used for demodulation of the MIB information and/or the SIB information, and
    wherein the type-2 subframe is not used by the base station to transmit a CRS used for demodulation; and
    receiving, by the terminal, on the first carrier according to the subframe configuration information, information sent by the base station including the MIB information and/or the SIB information in the type-1 subframe of the first carrier.

2. The method according to claim 1, wherein second information transmitted in the type-2 subframe does not include MIB information or SIB information.

3. The method according to claim 1, wherein a position of the type-2 subframe partially or completely overlaps with a position of a multicast-broadcast single-frequency network (MBSFN) subframe.

4. The method according to claim 1, wherein the type-2 subframe is used by the base station to transmit the second information including a second CRS, and wherein the second CRS is used to perform synchronization.

5. The method according to claim 4, further comprising:
before receiving the information sent by the base station, obtaining, by the terminal, configuration information of the first CRS or configuration information of the second CRS, which is used to indicate configuration of the first CRS or configuration of the second CRS; and
receiving the information sent by the base station according to (i) the subframe configuration information, and (ii) the configuration information of the first CRS or the configuration information of the second CRS.

6. A method for transmitting information, the method comprising:
determining, by a base station, subframe configuration information of a first carrier, wherein the subframe configuration information is used to indicate a type-1 subframe of the first carrier and a type-2 subframe of the first carrier,
wherein the type-1 subframe is used by a base station to transmit (i) master information block (MIB) information and/or system information block SIB information, and (ii) first information including a first cell-specific reference signal (CRS),
wherein the first CRS is used for demodulation of the MIB information and/or the SIB information, and
wherein the type-2 subframe is not used by the base station to transmit a CRS used for demodulation; and
sending, by the base station, on the first carrier according to the subframe configuration information, information including the MIB information and/or the SIB information in the type-1 subframe of the first carrier.

7. The method according to claim 6, wherein second information transmitted in the type-2 subframe does not include MIB information or SIB information.

8. The method according to claim 6, wherein a position of the type-2 subframe partially or completely overlaps with a position of a multicast-broadcast single-frequency network (MBSFN) subframe.

9. The method according to claim 6, wherein the type-2 subframe is used by the base station to transmit the second information including a second CRS, and wherein the second CRS is used to perform synchronization.

10. The method according to claim 9, further comprising:
before sending the information, determining, by the base station, configuration information of the first CRS or configuration information of the second CRS, which is used to indicate configuration of the first CRS or configuration of the second CRS,
sending the information according to (i) the subframe configuration information, and (ii) the configuration information of the first CRS or the configuration information of the second CRS.

11. A terminal, comprising:
a processor;
a receiver, configured to obtain subframe configuration information of a first carrier, and transmit the subframe configuration information to the processor, wherein the subframe configuration information is used to indicate a type-1 subframe of the first carrier and a type-2 subframe of the first carrier,
wherein the type-1 subframe is used by a base station to transmit (i) master information block (MIB) information and/or system information block (SIB) information, and (ii) first information including a first cell-specific reference signal (CRS),
wherein the first CRS is used for demodulation of the MIB information and/or the SIB information,
wherein the type-2 subframe is not used by the base station to transmit a CRS used for demodulation,
wherein the processor is configured to determine the type-1 subframe of the first carrier and the type-2 subframe of the first carrier according to the subframe configuration information, and
wherein the receiver is further configured to receive, on the first carrier according to the type-1 subframe of the first carrier and the type-2 subframe of the first carrier that are determined by the processor, information sent by the base station including the NIB information and/or the SIB information in the type-1 subframe of the first carrier.

12. The terminal according to claim 11, wherein second information transmitted in the type-2 subframe does not include MIB information or SIB information.

13. The terminal according to claim 11, wherein a position of the type-2 subframe partially or completely overlaps with a position of a multicast-broadcast single-frequency network (MBSFN) subframe.

14. The terminal according to claim 11, wherein the type-2 subframe is used by the base station to transmit the second information including a second CRS, and wherein the second CRS is used to perform synchronization.

15. The terminal according to claim 14, wherein the receiver is further configured to:
obtain configuration information of the first CRS or configuration information of the second CRS, wherein the configuration information of the first CRS or the configuration information of the second CRS is used to indicate configuration of the first CRS or configuration of the second CRS; and
receive the information sent by the base station according to (i) the type-1 subframe of the first carrier and the type-2 subframe of the first carrier that are determined by the processor, and (ii) the configuration information of the first CRS or the configuration information of the second CRS.

16. A base station, comprising:
a transmitter;
a processor, configured to determine subframe configuration information of a first carrier, and transmit the subframe configuration information to the transmitter, wherein the subframe configuration information is used to indicate a type-1 subframe of the first carrier and a type-2 subframe of the first carrier,
wherein the type-1 subframe is used by the base station to transmit (i) master information block (MIB) information and/or system information block (SIB) information, and (ii) first information including a first cell-specific reference signal (CRS),
wherein the first CRS is used for demodulation of the MIB information and/or the SIB information,
wherein the type-2 subframe is not used by the base station to transmit a CRS used for demodulation, and
wherein the transmitter is configured to send, on the first carrier according to the subfrarne configuration information, information including the MIB information and/or the SIB information in the type-1 subframe of the first carrier.

17. The base station according to claim 16, wherein second information transmitted in the type-2 subframe does not include MIB information or SIB information.

18. The base station according to claim 16, wherein a position of the type-2 subframe partially or completely overlaps with a position of a multicast-broadcast single-frequency network (MBSFN)subframe.

19. The base station according to claim 16, wherein the type-2 subframe is used by the base station to transmit the second information including a second CRS, and wherein the second CRS is used to perform synchronization.

20. The base station according to claim 19,
wherein the processor is further configured to determine configuration information of the first CRS or configuration information of the second CRS, and transmit the configuration information of the first CRS or the configuration information of the second CRS to the transmitter, wherein the configuration information of the first CRS or the configuration information of the second CRS is used to indicate configuration of the first CRS or configuration of the second CRS, and
wherein the transmitter is configured to send the information on the first carrier according to (i) the subframe configuration information, and (ii) the configuration information of the first CRS or the configuration information of the second CRS.

* * * * *